United States Patent [19]
Seok

[11] Patent Number: 6,104,159
[45] Date of Patent: Aug. 15, 2000

[54] FIELD WEAKENING CONTROL METHOD IN INDUCTION MOTOR

[75] Inventor: Jul-Ki Seok, Yongin, Rep. of Korea

[73] Assignee: Samsung Electronics Co., Ltd., Suwon, Rep. of Korea

[21] Appl. No.: 09/275,268

[22] Filed: Mar. 23, 1999

[30] Foreign Application Priority Data

Jul. 14, 1998 [KR] Rep. of Korea ..................... 98-28470

[51] Int. Cl.[7] .................................................. H02P 21/00
[52] U.S. Cl. ............................................ 318/812; 318/809
[58] Field of Search ..................... 318/798–801, 318/807–812

[56] References Cited

U.S. PATENT DOCUMENTS

| | | | |
|---|---|---|---|
| 4,088,934 | 5/1978 | D'Atre et al. | 318/802 |
| 4,088,935 | 5/1978 | D'Atre et al. | 318/802 |
| 4,310,794 | 1/1982 | Akamatsu | 318/800 |
| 5,585,708 | 12/1996 | Richardson et al. | 318/800 |

OTHER PUBLICATIONS

Kim, S.H., et al., "Maximum Torque Control of an Induction Machine in the Field Weakening Region", IEEE Transactions on Industry Applications, vol. 31, No. 4, Jul./Aug. 1995, pp. 787–794.

*Primary Examiner*—Bentsu Ro
*Attorney, Agent, or Firm*—Burns, Doane, Swecker & Mathis, L.L.P.

[57] ABSTRACT

A field weakening control method in an induction motor, wherein a voltage limit is set up in an oval while a current limit is established in a circle on a current plane, where x-coordinate represents a current value for flux portion and y-coordinate defines a current value for torque portion when the motor is in a normal state of constant speed and no load applied, to thereby form a current command according to a juncture thereof for generation of a torque, such that the oval voltage limit moves to a predetermined −(minus) quadrant against a coordinate representing the current value for torque portion in an excessive state where accelerated speed is formed or load is applied, to thereby cause torque of excessive state to increase in comparison with the normal state, such that there is an advantage in that torque is increased to improve an accelerated speed efficiency when the induction motor is under excessive state, and field weakening is conventionally controlled when the induction motor is under a normal state, thereby improving an efficiency during the excessive state and overall torque of the induction motor.

3 Claims, 2 Drawing Sheets

FIELD WEAKENING CONTROL METHOD IN INDUCTION MOTOR

BACKGROUND OF THE INVENTION

1. Field of the Invention

The present invention relates to a control method in an induction motor and more particularly to a field weakening control method in induction motor for controlling reverse electromotive force of an induction motor.

2. Description of the Prior Art

Generally, induction motors generate reverse electromotive force when they are operated according to rotating speed.

When the reverse electromotive force is increased in proportion to a rotary speed, there sometimes occurs a case where the reverse electromotive force becomes greater than driving voltage applied to the motor, such that in order to avoid this kind of occurrence, a field weakening control is enforced to decrease the flux in reverse proportion to rotating speed of the motor. In other words, decrease of the flux in reverse proportion to the rotating speed of the motor serves to decrease torque and to prevent the reverse electromotive force from growing larger than the driving voltage.

However, when the flux is decreased in reverse proportion to rotating speed, there occurs too much loss of driving torque at a high speed region, such that field weakening region is controlled as below in order to maximize the driving torque at the high speed region. Rotor flux of an induction motor in the control of field weakening region is shown as per the following formula 1.

$$\lambda_{dr}^e = L_m i_{ds}^e \qquad \text{[Formula 1]}$$

where, $\lambda_{dr}^e$: rotor flux
$L_m$: magnetization inductance and
$i_{ds}^e$: current for synchronized coordinate flux The rotor flux according to Formula 1 can be obtained by simultaneous solutions according to voltage and current limiting condition of invertor determined by Formula 2 and stator simultaneous coordinate voltage equation according to Formula 3.

$$V_{ds}^{e2} + V_{qs}^{e2} \leq V_{s\,max}^2$$

$$i_{ds}^{e2} + i_{qs}^{e2} \leq I_{s\,max}^2, \qquad \text{[Formula 2]}$$

where, $i_{ds}^e$: current for synchronous coordinate flux
$i_{qs}^e$: current for synchronous coordinate torque
$V_{ds}^e$: voltage for synchronous coordinate flux, and
$V_{qs}^e$: voltage for synchronous coordinate torque.

$V_{s\,max}$ which is a voltage limiting value in the above formula 2 is defined by general inverter direct current voltage and voltage modulating method, and $I_{s\,max}$ which is a current limiting value is obtained by semiconductor element thermal rating and current rating. Here, if a rotor flux of an induction motor is operated at a normal condition, an equation for obtaining an induction motor rotor synchronous coordinate voltage can be given by the following formula 3.

$$V_{qs}^e = r_s i_{ds}^e + \omega_e L_s i_{ds}^e$$

$$V_{ds}^e = r_s i_{ds}^e - \omega_e L_\sigma i_{qs}^e \qquad \text{[Formula 3]}$$

where, $r_s$: stator resistance value
$\omega_e$: revolution
$L_s$: stator inductance, and
$L_\sigma$: leakage inductance As mentioned above, when the Formulas 2 and 3 are united, a voltage limit at current plane is expressed in an oval and a current limit is defined in a circle, as illustrated in FIG. 3, where, an inner joint region of the oval and the circle represents a current command corresponding to an operational condition.

Of course, the above voltage equation of stator synchronous coordinate is given under an resumption that rotor flux is in normal state (namely, speed and load are under a constant state). Rotor flux and current for torque portion at a field weakening region No. 1 where a juncture between the oval and the circle is formed are expressed by Formula 4 and rotor flux and current for torque portion at a field weakening region No. 2 where a juncture between the oval and the circle is not formed (super high speed condition) are defined by Formula 5.

$$\lambda_{dr}^e = L_m \sqrt{\frac{(V_{s\,max}/\omega_e)^2 - (L_\sigma I_{s\,max})^2}{L_s^2 - L_\sigma^2}} \qquad \text{[Formula 4]}$$

$$i_{qs}^e = \sqrt{I_{s\,max}^2 - i_{ds}^{e2}}$$

$$\lambda_{dr}^{e2} = L_m \frac{V_{s\,max}}{\sqrt{2}\,\omega_e L_s} \qquad \text{[Formula 5]}$$

$$i_{qs}^{e2} = \frac{V_{s\,max}}{\sqrt{2}\,\omega_e L_s}$$

In other words, the above weakened field control method for induction motor assumes that a motor is in a normal operational state, where same reverse electromotive force is decreased from the entire motor operational regions according to Formulas 4 and 5, thereby expressing the rotor flux and current for torque portion.

Here, speed arrived characteristic experimental value of the induction motor is (1–X) which is the time reaching 4,400 rpm as illustrated in FIG. 4, where torque and flux from predetermined curves.

SUMMARY OF THE INVENTION

However, there is a problem in that, when the field weakening control is performed as mentioned above on the assumption that the operational state of the induction motor is in the normal condition, torque in an excessive state (when load is applied and when speed is increased or decreased) of the induction motor becomes very weak, such that an accelerated characteristic of the induction motor is deteriorated to thereby decrease the entire efficiency of the induction motor.

The present invention is disclosed to solve the aforementioned problem and it is an object of the present invention to provide a field weakening control method in induction motor adapted to improve an accelerated characteristic of an induction motor in an excessive state, thereby increasing an entire efficiency of the induction motor.

In accordance with the object of the present invention, there is provided a field weakening control method in an induction motor, wherein a voltage limit is set up in an oval while a current limit is established in a circle on a current plane, where x-coordinate represents a current value for flux portion and y-coordinate defines a current value for torque portion when the motor is in a normal state of constant speed and no load applied, to thereby form a current command according to a juncture thereof for generation of a torque, such that the oval voltage limit moves to a predetermined minus quadrant against a coordinate representing the current value for torque portion in an excessive state where accelerated speed is formed or load is applied, to thereby cause torque of excessive state to increase in comparison with the normal state.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
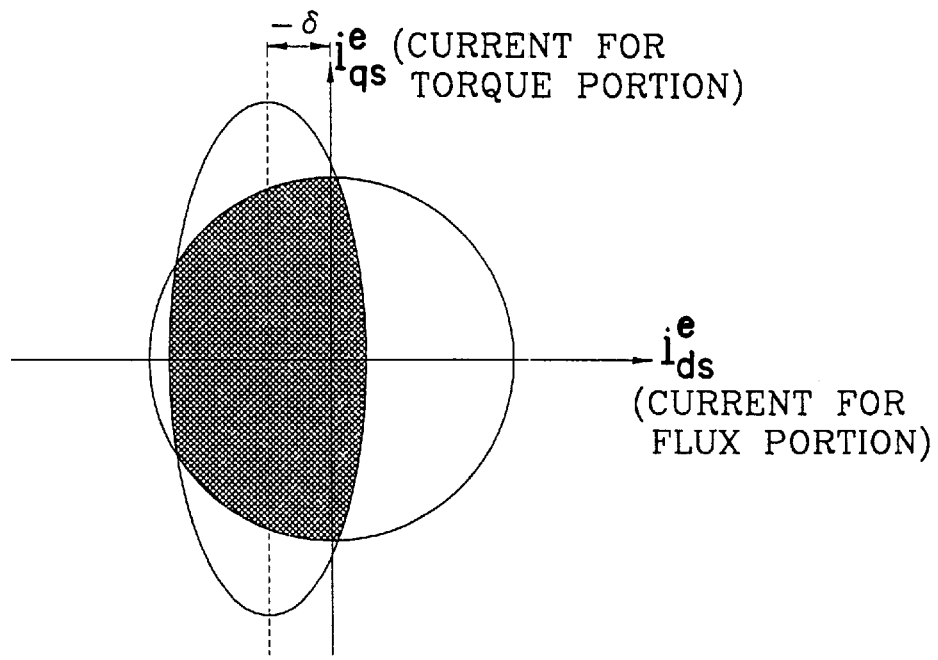
FIG. 1 is a graph for illustrating a current limit and a voltage limit on a current plane of excessive state in a field weakening control method according to the present invention.

FIG. 1 is a graph for illustrating a current limit and a voltage limit on a current plane of excessive state in a weakened field control method according to the present invention, where it is shown that a voltage limit region defined by an oval against a current limit represented by a circle is moved by −(minus) δ against the current for torque portion.

Rotor flux according to the graph in FIG. 1 is given by Formula 6 below.

$$\lambda_{dr}^e = \frac{L_m}{1+p\tau_r} i_{ds}^e \quad \left(\text{where, } \tau_r = \frac{L_r}{r_r}\right) \quad \text{[Formula 6]}$$

p: differential operator $\tau_r$: rotor time constant

Of course, flux under a normal state of induction motor is controlled according to Formulas 4 and 5, however a weakened field control according to Formula 6 is applied only when the induction motor is under excessive state (during application of load or accelerated/decelerated speed).

A synchronous coordinate stator voltage equations according to the excessive state characteristic of rotor flux are expressed by Formula 7 below.

$$V_{qs}^e = r_s i_{qs}^e + \omega_e \lambda_{ds}^e = r_s i_{qs}^e + \omega_e \left( L_\sigma i_{ds}^e + \frac{L_m}{L_r} \lambda_{dr}^e \right) \quad \text{[Formula 7]}$$

$$V_{ds}^e = r_s i_{ds}^e - \omega_e \lambda_{qs}^e = r_s i_{ds}^e - \omega_e L_\sigma i_{qs}^e$$

When Formula 7 is solved in association with Formula 3, a voltage limit oval which shows a movement of −(minus) δ is formed as shown in FIG. 1, and when a junction between the voltage limit oval and current limit circle is obtained, a current value for rotor flux portion and a current value for torque portion which show a maximum torque at the weakened field region No. 1 can be obtained. This is defined in Formula 8 below.

$$i_{ds}^e = \frac{\left(-L_s \delta + \sqrt{(L_s \delta)^2 + (L_s^2 - L_\sigma^2)((V_{s\max}/\omega_e)^2 - \delta^2 - L_\sigma^2 I_{s\max}^2)}\right)}{(L_s^2 - L_\sigma^2)} \quad \text{[Formula 8]}$$

$$\left(\text{where, } \delta = \frac{L_m}{L_r} \alpha e^{\frac{1}{\tau 1}}\right)$$

$$i_{qs}^e = \sqrt{I_{s\max}^2 - i_{ds}^{e2}}.$$

where, $\delta = L_m/L_r \alpha e 1/\tau 1)$

Here, the reason the rotor flux of Formula 6 shows the maximum torque according to Formula 8 is that the voltage limit oval moves by −(minus) δ during excessive state to cause the torque according to the current value of Formula 8 to increase, thereby further expediting speed increase during application of load or accelerated/decelerated speed.

Figure 2:
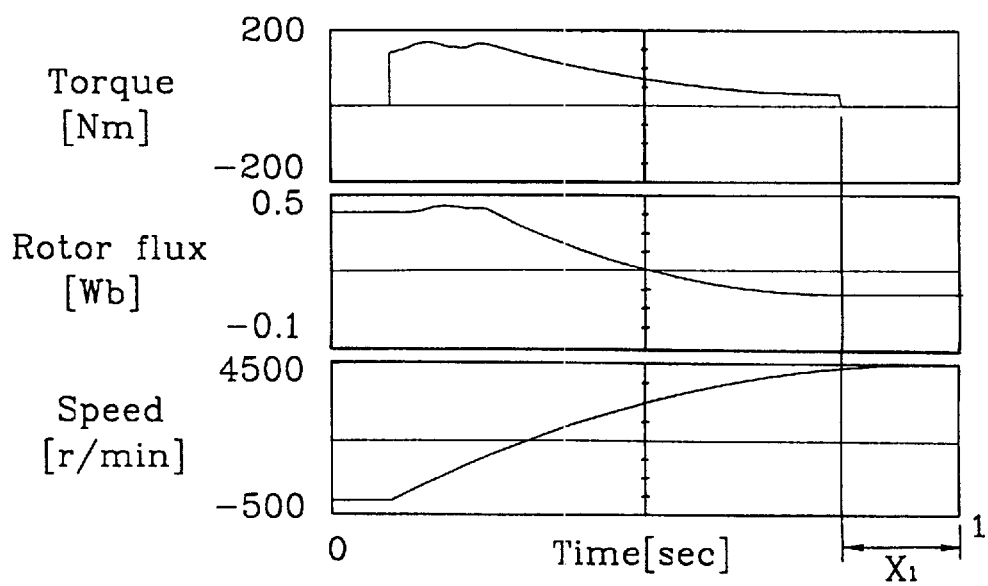
FIG. 2 is a graph for illustrating a speed arrival characteristic experimental value of an induction motor utilizing a field weakening control method according to the present invention.
Figure 3:
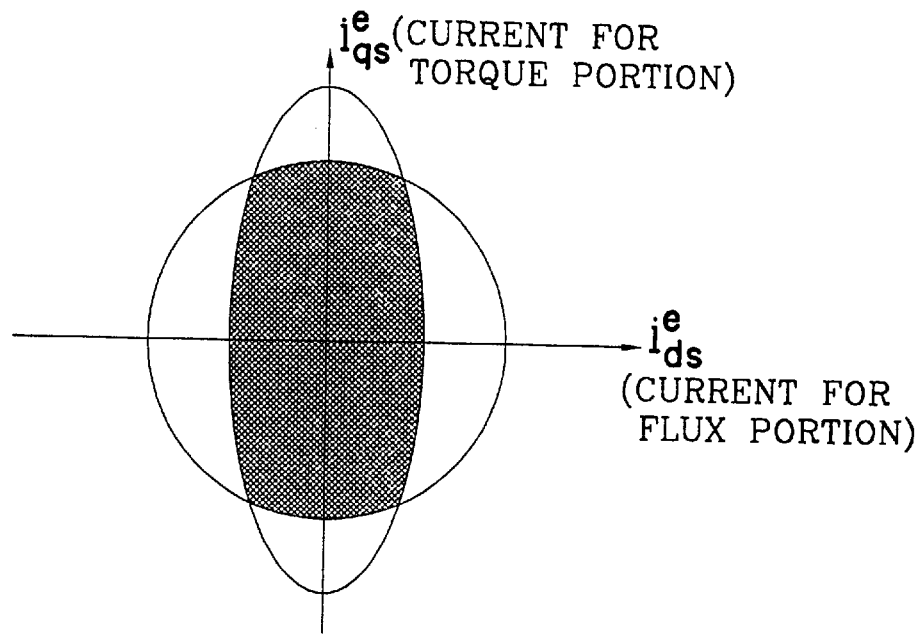
FIG. 3 is a graph for illustrating current and voltage limit on a current plane during a normal state and accelerated/decelerated speed in a field weakening control method in a general induction motor.
Figure 4:
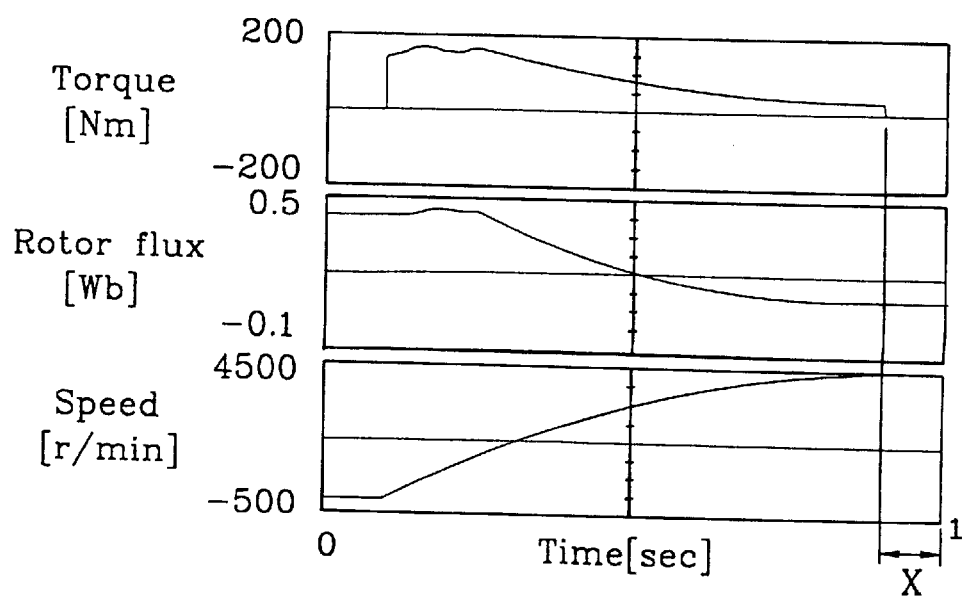
FIG. 4 is a graph for illustrating a speed arrival characteristic of an induction motor in FIG. 3.

In other words, as illustrated in FIG. 2, the time arriving at 4,400 rpm becomes $(1-X_1)$, where $x_1 > x$ and difference between $x_1$ and x is approximately 10~20%, and arrival time of the present invention is expedited as much as the difference to thereby increase an operational efficiency of the entire motor.

A value according to field weakening region No. 2 where a junction between the current limit circle and the voltage limit oval does not occur is expressed by Formula 9 below.

$$i_{ds}^e = \frac{-b + \sqrt{b^2 - 4ac}}{2a} \quad \text{[Formula 9]}$$

$$\left(\text{where, } a = 2L_m L_s^2, \quad b = L_s^2 \alpha e^{\frac{-1}{\tau}} + 3L_m L_s \delta,\right.$$

$$\left. c = L_s \delta \alpha e^{\frac{-1}{\tau}} + L_m \delta^2 - L_m (V_{s\max}/\omega_e)^2 \right)$$

$$i_{qs}^e = \frac{\sqrt{(V_{s\max}/\omega_e)^2 - (L_s L_{ds}^e + \delta)^2}}{L_\sigma}$$

As apparent from the foregoing, there is an advantage in the field weakening control method according to the present invention in that torque is increased to improve an accelerated speed efficiency when an induction motor is under excessive state, and field weakening is conventionally controlled when the induction motor is under a normal state, thereby improving an efficiency during the excessive state and overall torque of the induction motor.

What is claimed is:

1. A field weakening control method in an induction motor, wherein a voltage limit is set up in an oval while a current limit is established in a circle on a current plane, where x-coordinate represents a current value for flux portion and y-coordinate defines a current value for torque portion when the motor is in a normal state of constant speed and no load applied, to thereby form a current command according to a juncture thereof for generation of a torque, such that the oval voltage limit moves to a predetermined minus quadrant against a coordinate representing the current value for torque portion in an excessive state where accelerated speed is formed or load is applied, to thereby cause torque of excessive state to increase in comparison with the normal state.

2. The control method as defined in claim 1, wherein a current value for rotor flux portion and a current value for torque portion in a region where said juncture is formed between voltage limit value and current limit value in excessive state, are determined using formulas as follows:

$$i_{ds}^e = \frac{-L_s\delta + \sqrt{(L_s\delta)^2 + (L_s^2 - L_\sigma^2)(V_{s\max}/\omega_e)^2 - \delta^2 - L_\sigma^2 I_{s\max}^2}}{L_s^2 - L_\sigma^2}$$

where: $\delta = \frac{L_m}{L_r}\alpha e^{\frac{1}{\tau l}}$ $$i_{qs}^e = \sqrt{I_{s\max}^2 - i_{ds}^{e2}}$$

where:

$\delta = L_m/L_r \alpha e^{1/\tau 1}$ $i_{qs}^e = \sqrt{I_{s\,max}^2 - i_{ds}^{e2}}$ $i_{ds}^e$=current for synchronous coordinate flux $i_{qs}^e$=current for synchronous coordinate torque $L_s$=stator self inductance $L_o$=leakage inductance $L_m$=magnetizing inductance $L_r$=rotor self inductance $\omega_e$=excitation angular frequency.

3. The control method as defined in claim 1, wherein a current value for rotor torque portion and a current value for flux portion in a region where said juncture is not formed between the oval voltage limit and circled current limit, are determined by using formulas as follows:

$$i_{ds}^e = \frac{-b + \sqrt{b^2 - 4ac}}{2a}$$

where: $a = 2L_m L_s^2$ $b = L_s^2 \alpha e^{\frac{-1}{\tau}} + 3L_m L_s \delta$, $c = L_s \delta \alpha e^{\frac{-1}{\tau}} + L_m \delta^2 - L_m(V_{s\max}/\omega_e)^2$ $$i_{qs}^e = \frac{\sqrt{(V_{s\max}/\omega_e)^2 - (L_s L_{ds}^e + \delta)^2}}{L_\sigma}$$

$i_{ds}^e$=current for synchronous coordinate flux $i_{qs}^e$=current for synchronous coordinate torque $L_s$=stator self inductance $L_m$=magnetizing inductance $\omega_e$=excitation angular frequency.

* * * * *